(12) United States Patent
Lei et al.

(10) Patent No.: US 9,983,082 B2
(45) Date of Patent: May 29, 2018

(54) VOLUTE MECHANISM FOR BLOWER

(71) Applicant: ZHONGSHAN BROAN-OCEAN MOTOR CO., LTD., Zhongshan (CN)

(72) Inventors: Wei Lei, Zhongshan (CN); Xiongcheng Wang, Zhongshan (CN); Song Jia, Zhongshan (CN); Xianjun Liu, Zhongshan (CN); Yunyi Luo, Zhongshan (CN); Wenbo Yang, Zhongshan (CN); Jianhua Zeng, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 955 days.

(21) Appl. No.: 13/786,429

(22) Filed: Mar. 5, 2013

(65) Prior Publication Data

US 2013/0178140 A1     Jul. 11, 2013

Related U.S. Application Data

(63) Continuation-in-part of application No. PCT/CN2011/085135, filed on Dec. 31, 2011.

(51) Int. Cl.
*F24F 7/00* (2006.01)
*G01L 19/00* (2006.01)
*F04D 29/42* (2006.01)

(52) U.S. Cl.
CPC ...... *G01L 19/0007* (2013.01); *F04D 29/4226* (2013.01)

(58) Field of Classification Search
CPC ............. G01L 19/0007; F04D 29/4226; F04D 27/001; F04D 29/4206; F04D 29/4233; F01D 25/24; F05B 2260/83
See application file for complete search history.

(56) References Cited

U.S. PATENT DOCUMENTS

| 2,773,632 | A | * | 12/1956 | Dobbins | B65D 47/061 222/525 |
| 5,317,924 | A | * | 6/1994 | Maack | G01L 19/0007 220/691 |
| 5,839,374 | A | * | 11/1998 | Conner | F04D 23/001 110/162 |
| 2010/0298993 | A1 | * | 11/2010 | Eaton | H01R 13/6456 700/282 |

* cited by examiner

*Primary Examiner* — Brandon Lee
(74) *Attorney, Agent, or Firm* — Matthias Scholl, PC; Matthias Scholl

(57) ABSTRACT

A volute mechanism for a blower, the mechanism including: a volute (1), the volute (1) including a cavity (11) and a first through hole (12); and a manometric interface (2), the manometric interface (2) including a second through hole (21) inside. The cavity (11) is arranged inside the volute (1) for accommodating a wheel. The manometric interface (2) is disposed in the first through hole (12) and is movable along an axial direction of the first through hole (12). The second through hole (21) and the cavity (11) are in communication.

16 Claims, 13 Drawing Sheets

VOLUTE MECHANISM FOR BLOWER

CROSS-REFERENCE TO RELATED APPLICATIONS

This application is a continuation-in-part of International Patent Application No. PCT/CN2011/085135 with an international filing date of Dec. 31, 2011, designating the United States, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

Field of the Invention

The invention relates to a volute mechanism for a blower.

Description of the Related Art

As an element installed on the side of a blower, a manometric interface is a safety device. Although a small volume it has, the manometric interface has a great significance. A negative pressure value is output from the manometric interface and directly connected to the air switch which controls the operation of the whole system. Different loads impose different requirements on the output value of the manometric interface. A typical method is to change a position or a shape of the manometric interface for achieving a qualified output value of the manometric interface. Thus, a blower including a plurality of manometric interfaces with different structures or different positions is produced, thereby improving the production cost and the difficulties in quality monitoring.

SUMMARY OF THE INVENTION

In view of the above-described problems, it is one objective of the invention to provide a volute mechanism for a blower. The volute mechanism has a simple structure, flexible adaptation to different kinds of blowers, and low production cost.

To achieve the above objective, in accordance with one embodiment of the invention, there is provided a volute mechanism for a blower. The volute mechanism comprises: a volute, the volute comprising a cavity and a first through hole; and a manometric interface, the manometric interface comprising a second through hole inside. The cavity is arranged inside the volute for accommodating a wheel. The manometric interface is disposed in the first through hole and is movable along an axial direction of the first through hole. The second through hole and the cavity are in communication.

In a class of this embodiment, a sealing sleeve is disposed outside the manometric interface at the first through hole. The sealing sleeve comprises: a neck arranged on an outer side, and a mounting hole arranged on an inner side. The neck is received by a base plate of the volute. The manometric interface is received by the mounting hole and is movable along an axial direction of the mounting hole.

In a class of this embodiment, an end of the manometric interface comprises a flange.

In a class of this embodiment, the volute comprises a side and a top, the side comprises an air outlet, and the top is convex to form an annular boss. The manometric interface is disposed on the annular boss behind the air outlet and in communication with the cavity. A line L1 is perpendicular to a cross section of the air outlet, a line L2 crosses a center point O1 of the volute and is perpendicular to the line L1. The manometric interface comprises a center point O2. The center point O2 is disposed in an area A formed by rotating the line L2 clockwise for an angle α; and the angle α is between 5° and 10°.

In a class of this embodiment, the center point O2 of the manometric interface is arranged in a middle part of the area A.

In a class of this embodiment, a diversion port is disposed on the air outlet of the volute. An air duct is disposed on the diversion port. An inner wall of the diversion port protrudes inclinedly to form a convex block. One end of the convex block is close to the air outlet; and the other end of the convex block is tightly attached to a side wall of the air duct.

In a class of this embodiment, the diversion port is mounted on the volute by a bolt.

In a class of this embodiment, the diversion port comprises a lug.

In a class of this embodiment, a plurality of mounting columns are disposed on the volute. Each mounting column comprises a threaded hole. An air switch comprising a mounting foot comprising a mounting hole is provided; and a bolt is inserted into the mounting hole and threaded into the threaded hole for fixing the air switch on the volute.

In a class of this embodiment, the mounting column comprises two positioning columns disposed on two sides of the threaded hole. An inner surface of each positioning column matches with a lateral face of the mounting foot. The mounting foot is fastened by the positioning columns.

In a class of this embodiment, the number of the mounting columns is two.

In a class of this embodiment, a block is disposed on the volute between the two mounting columns. The block comprises a recess. The air switch comprises a duct protruding downward from a base of the air switch. The duct is supported by a base of the recess.

In a class of this embodiment, the block comprises a gap; and the gap is in communication with the recess.

Advantages of the invention are summarized as follows:

1) The manometric interface is disposed in the first through hole and is movable along the axial direction of the first through hole. The second through hole and the cavity are in communication. The structure is simple, applicable to different kinds of blowers, and low in production cost.
2) The sealing sleeve is disposed outside the manometric interface at the first through hole. The sealing sleeve comprises: the neck arranged on the outer side, and the mounting hole arranged on the inner side. The neck is received by the base plate of the volute. The manometric interface is received by the mounting hole and is movable along the axial direction of the mounting hole. The sealing sleeve is suitable for a volute comprising a thin wall, and assures the manometric interface move along the axial direction, furthermore, the sealing effect of the sealing sleeve is good.
3) The end of the manometric interface comprises the flange, thereby preventing the manometric interface from falling down.
4) The air outlet is disposed on the side of the volute, and the manometric interface is disposed on the annular boss behind the air outlet and in communication with the cavity. Line L1 is perpendicular to the air outlet, line L2 crosses center point O1 and is perpendicular to line L1. Center point O2 of the manometric interface is disposed in an area A formed by rotating line L2 clockwise for angle α; and angle α is between 5° and 10°. The manometric interface is disposed in the largest negative pressure area, thereby improving the output value of the negative pressure and the safety factor.

5) The diversion port is disposed on the air outlet. The air duct is disposed on the diversion port. The inner wall of the diversion port protrudes inclinedly to form the convex block. One end of the convex block is close to the air outlet; and the other end of the convex block is tightly attached to the side wall of the air duct. Thus, the back streaming phenomenon caused by the dislocation of the air duct and the air outlet is prevented, and the air stream passes more fluently through the air outlet of the volute.

6) A plurality of mounting columns comprising the threaded hole are disposed on the volute. The air switch comprising the mounting foot comprising the mounting hole is provided; and a bolt is inserted into the mounting hole and threaded into the threaded hole for fixing the air switch on the volute. The structure is simple and easy to assemble, thereby improving the stability and the efficiency of assembling.

7) The mounting column comprises two positioning columns disposed on two sides of the threaded hole. The inner surface of each positioning column matches with the lateral face of the mounting foot. The mounting foot is fastened by the positioning columns. The structure is reasonably designed, and the air switch has a good stability.

8) The block is disposed on the volute between the two mounting columns. The block comprises the recess. The air switch comprises the duct protruding downward from the base of the air switch. The duct is disposed on the base of the recess. The block comprises the gap which is in communication with the recess. The gap enables the air to pass into or out of the air switch via the air duct.

DETAILED DESCRIPTION OF THE EMBODIMENTS

Figure 1:
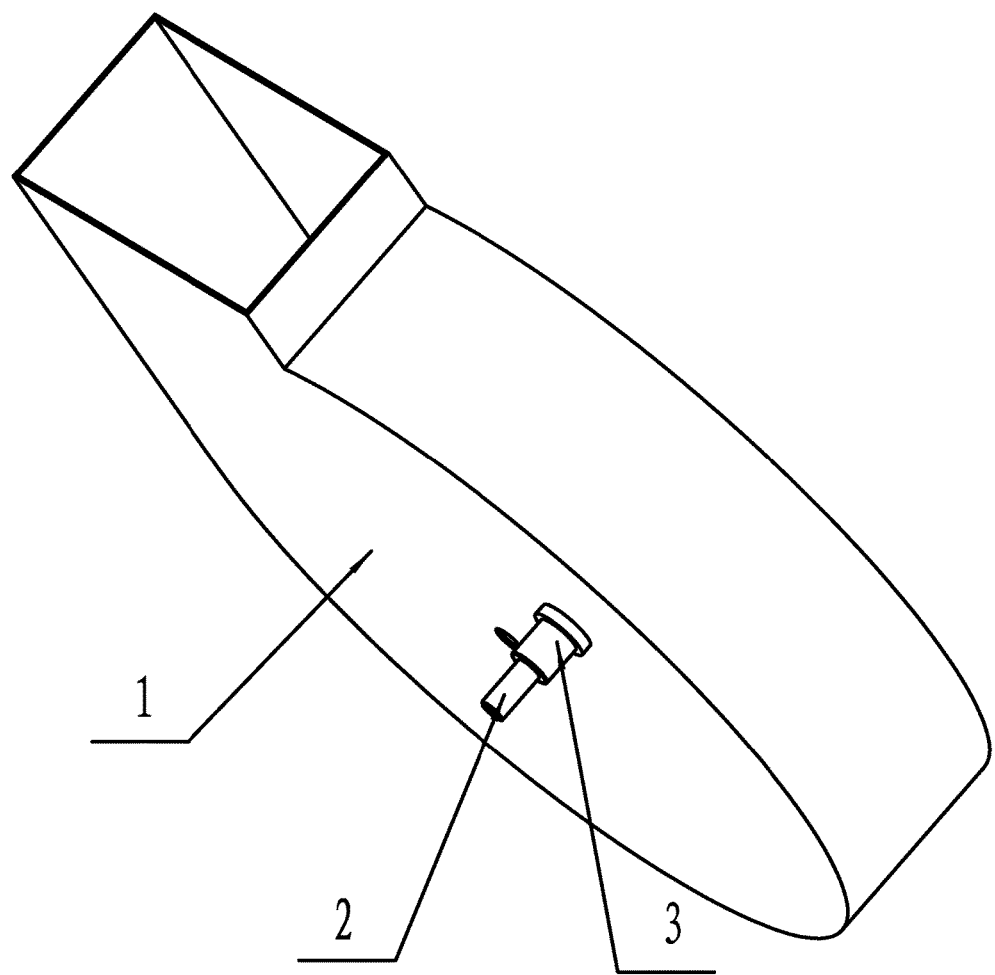
FIG. 1 is a stereogram of a volute comprising a flat surface on a top.
Figure 2:
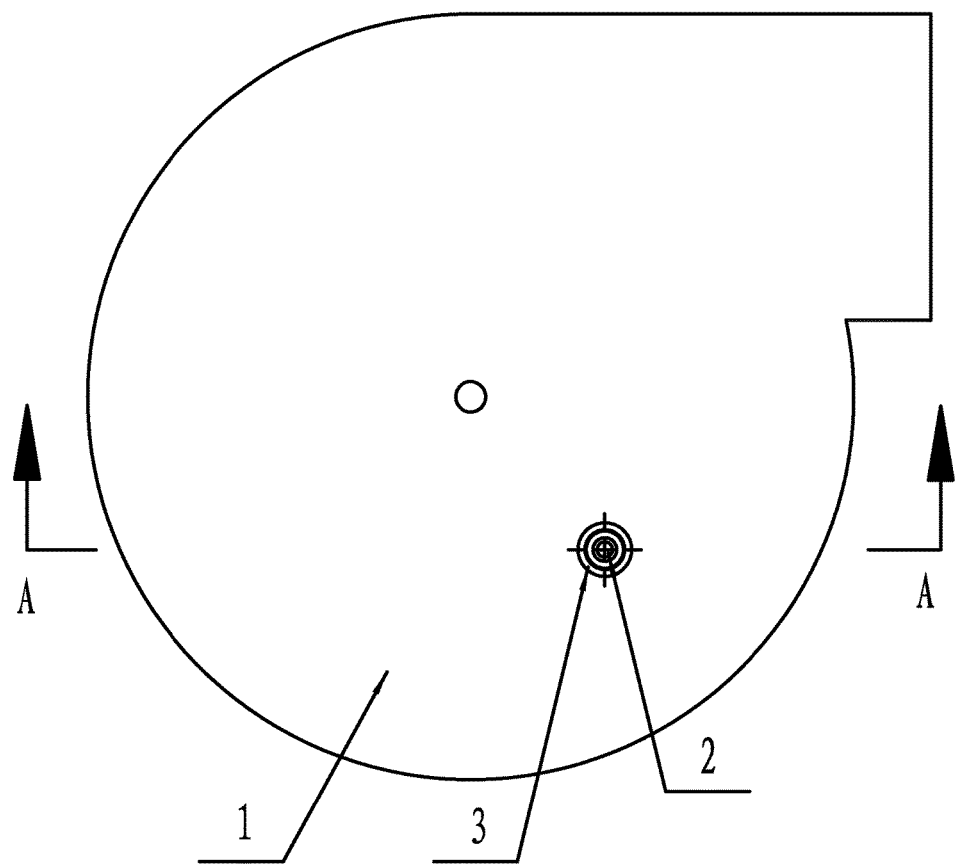
FIG. 2 is a schematic diagram of a volute comprising a flat surface on a top.
Figure 3:
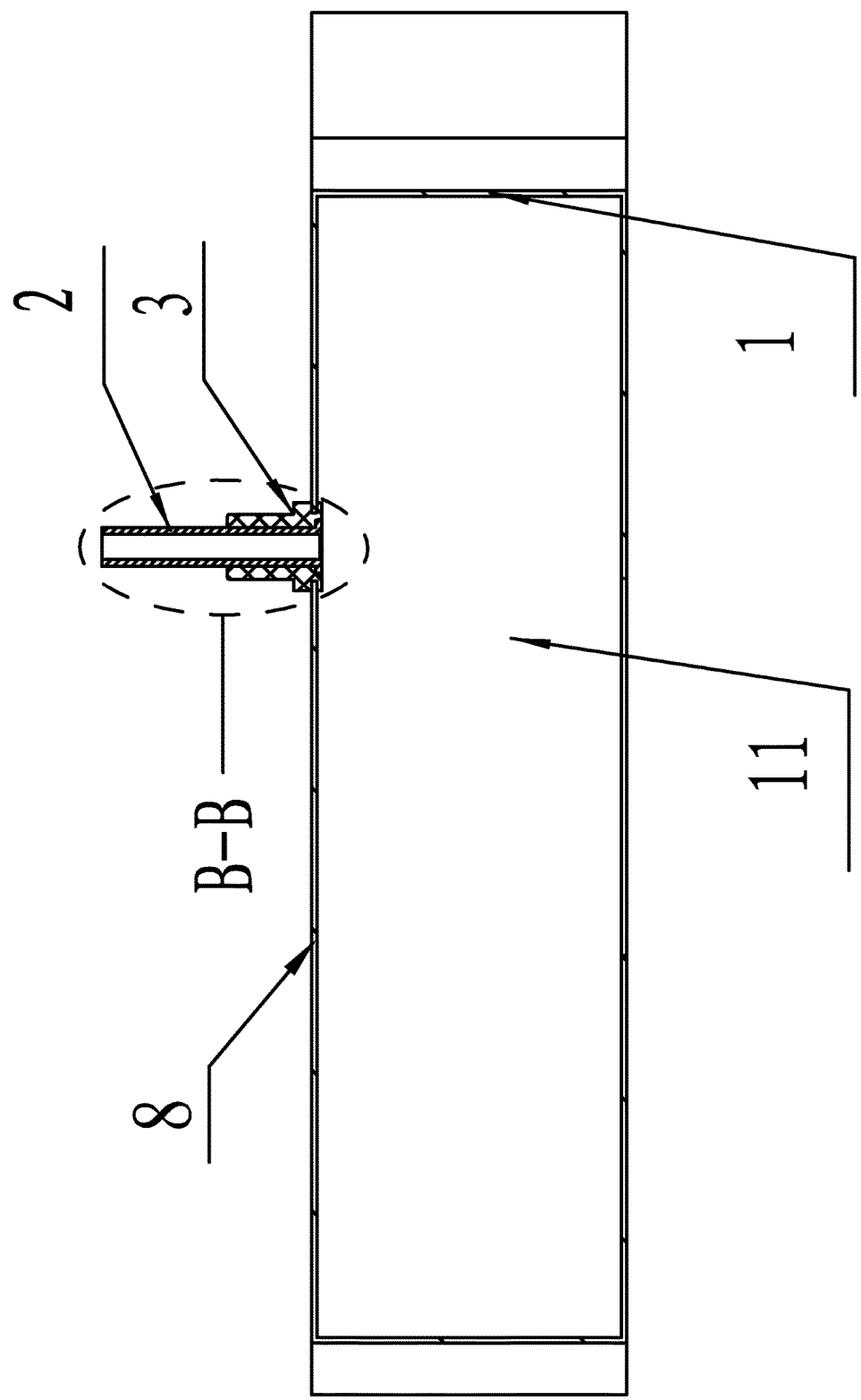
FIG. 3 is a local cross section view taken from line A-A of FIG. 2.
Figure 4:
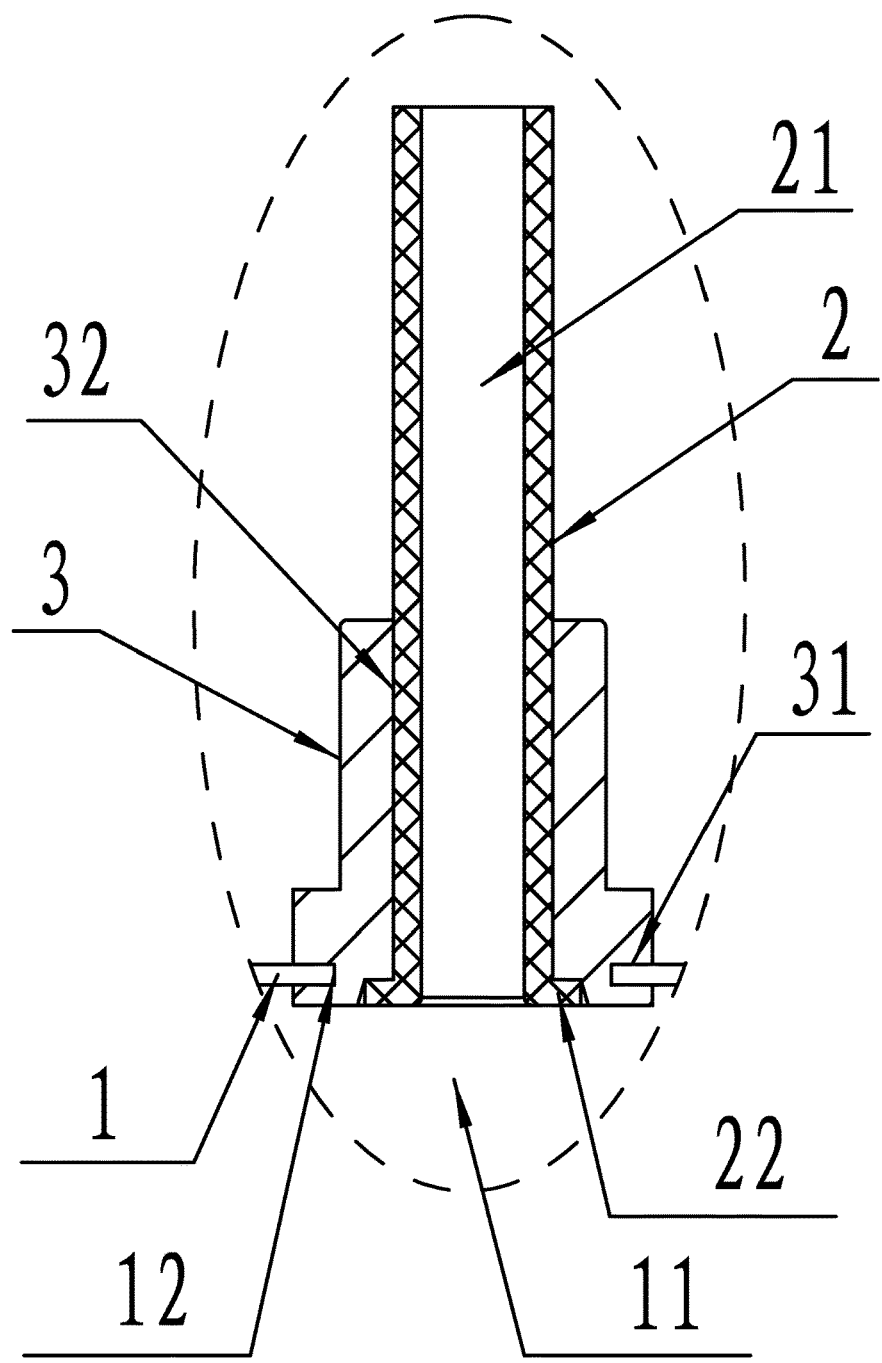
FIG. 4 is an enlarged view taken from part B-B of FIG. 3.

For further illustrating the invention, experiments detailing a volute mechanism for a blower are described below. It should be noted that the following examples are intended to describe and not to limit the invention.

Example 1

As shown in FIGS. 1-4, a volute mechanism for a blower comprises: a volute 1, the volute 1 comprising a cavity 11 and a first through hole 12; and a manometric interface 2, the manometric interface 2 comprising a second through hole 21 inside. The cavity 11 is arranged inside the volute 1 for accommodating a wheel. The manometric interface 2 is disposed in the first through hole 12 and is movable along an axial direction of the first through hole 12. The second through hole 21 and the cavity 11 are in communication.

Example 2

As shown in FIGS. 1-4, based on Example 1, a sealing sleeve 3 is disposed outside the manometric interface 2 at the first through hole 12. The sealing sleeve 3 comprises: a neck 31 arranged on an outer side, and a mounting hole 32 arranged on an inner side. The neck 31 is received by a base plate 8 of the volute 1. The manometric interface 2 is received by the mounting hole 32 and is movable along an axial direction of the mounting hole 32.

Example 3

As shown in FIGS. 1-4, based on Example 1 or 2, an end of the manometric interface 2 comprises a flange 22.

Example 4

Figure 5:
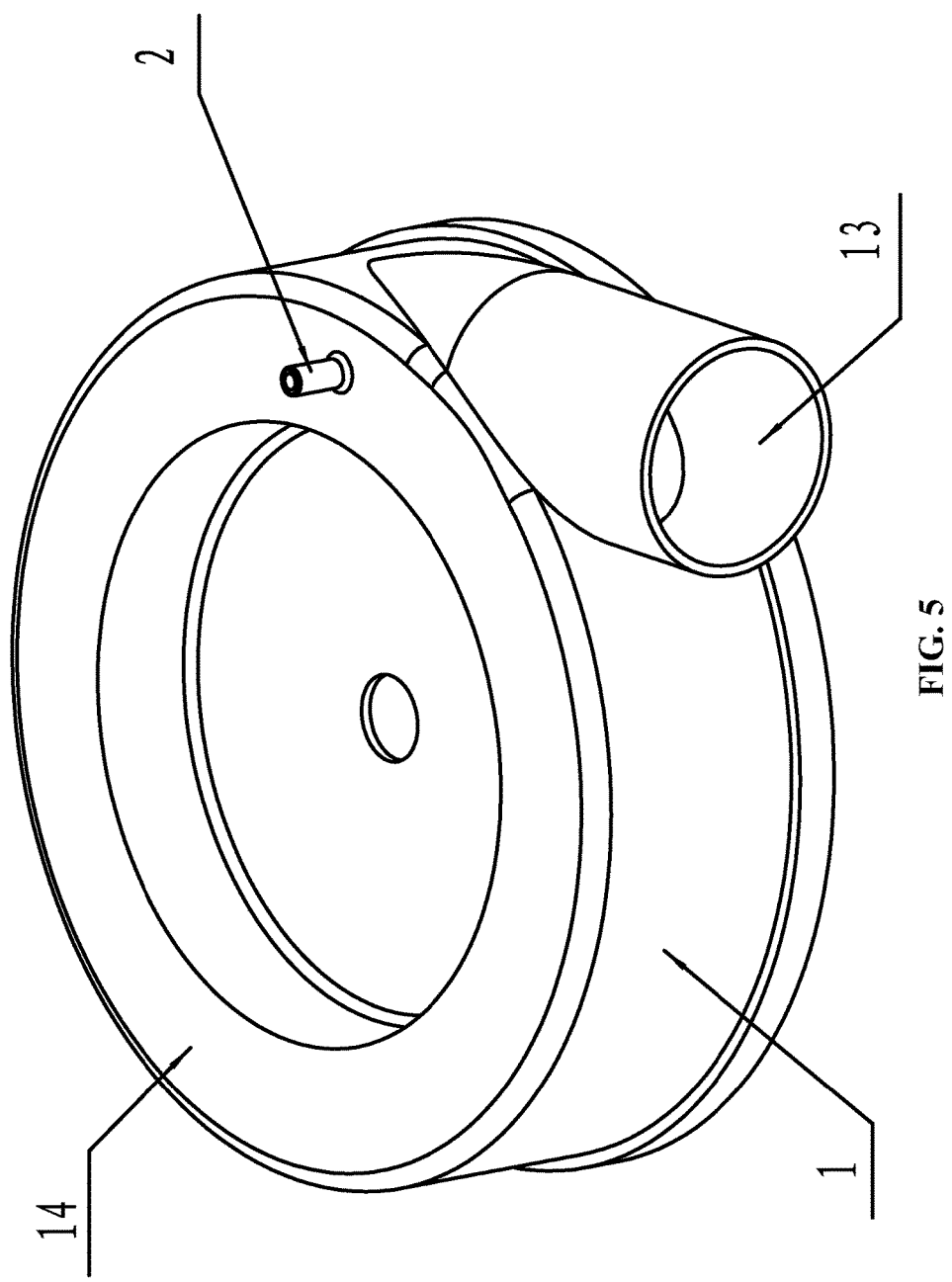
FIG. 5 is a stereogram of a volute comprising an annular boss on a top.
Figure 6:
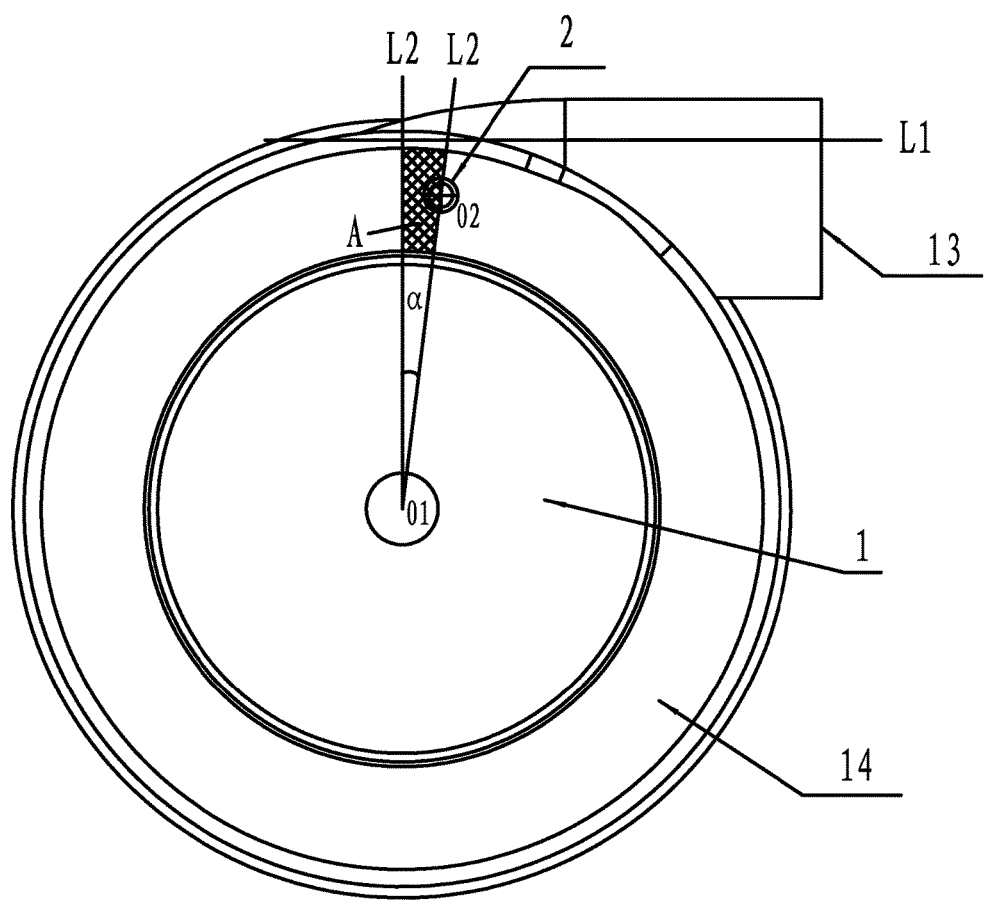
FIG. 6 is a schematic diagram of a volute comprising an annular boss on a top.

As shown in FIGS. 5-6, based on Example 1, the volute 1 comprises a side and a top, the side comprises an air outlet 3, and the top is convex to form an annular boss 14. The manometric interface 2 is disposed on the annular boss 14 behind the air outlet 13 and in communication with the cavity 11. A line L1 is perpendicular to the air outlet 13, a line L2 crosses a center point O1 of the volute and is perpendicular to the line L1. The manometric interface 2 comprises a center point O2. The center point O2 is disposed in an area A formed by rotating the line L2 clockwise for an angle α; and the angle α is between 5° and 10°.

Example 5

As shown in FIGS. 5-6, based on Example 4, the center point O2 of the manometric interface 2 is arranged in a middle part of the area A.

Example 6

Figure 7:
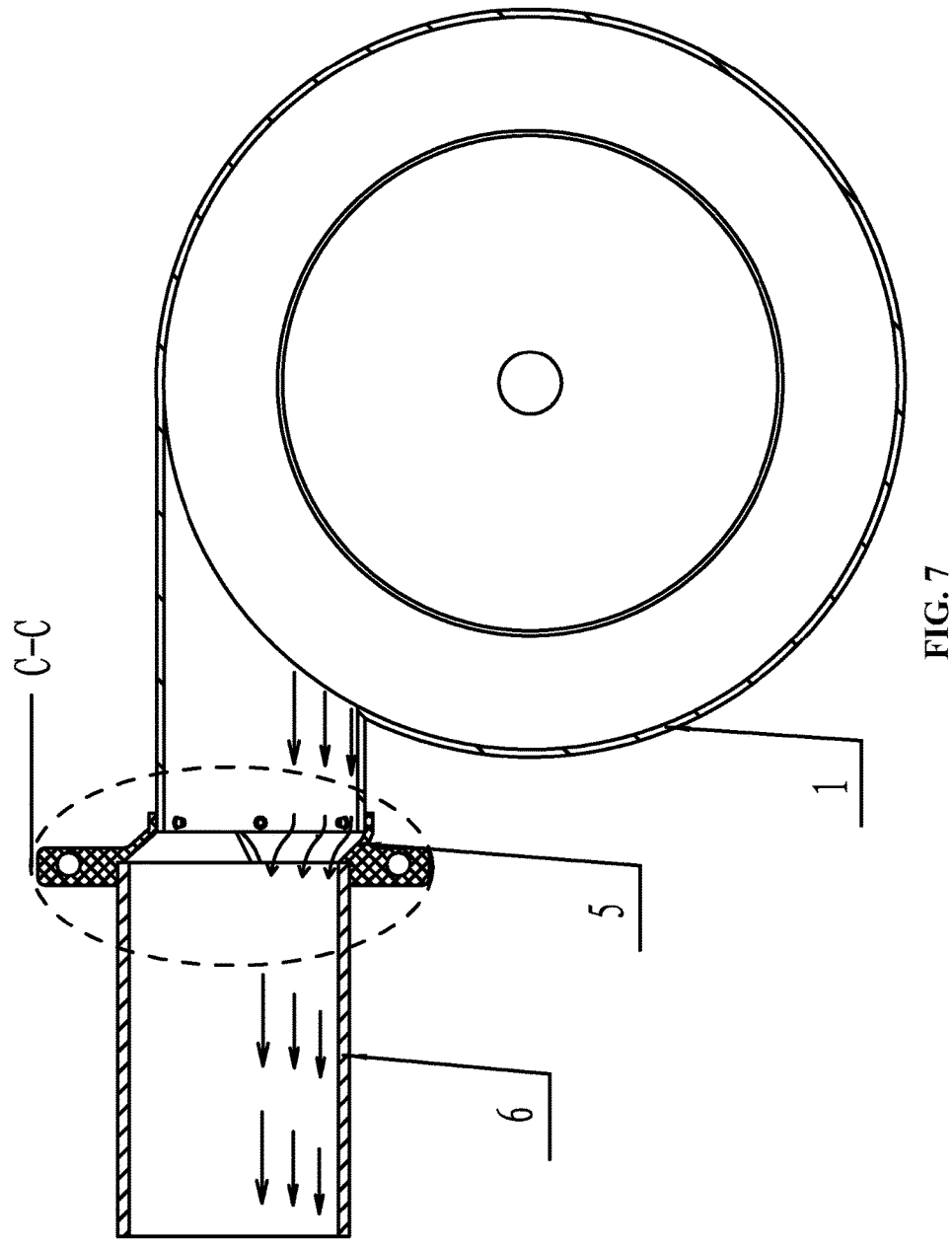
FIG. 7 is an assembling stereogram of a volute and an air duct.
Figure 8:
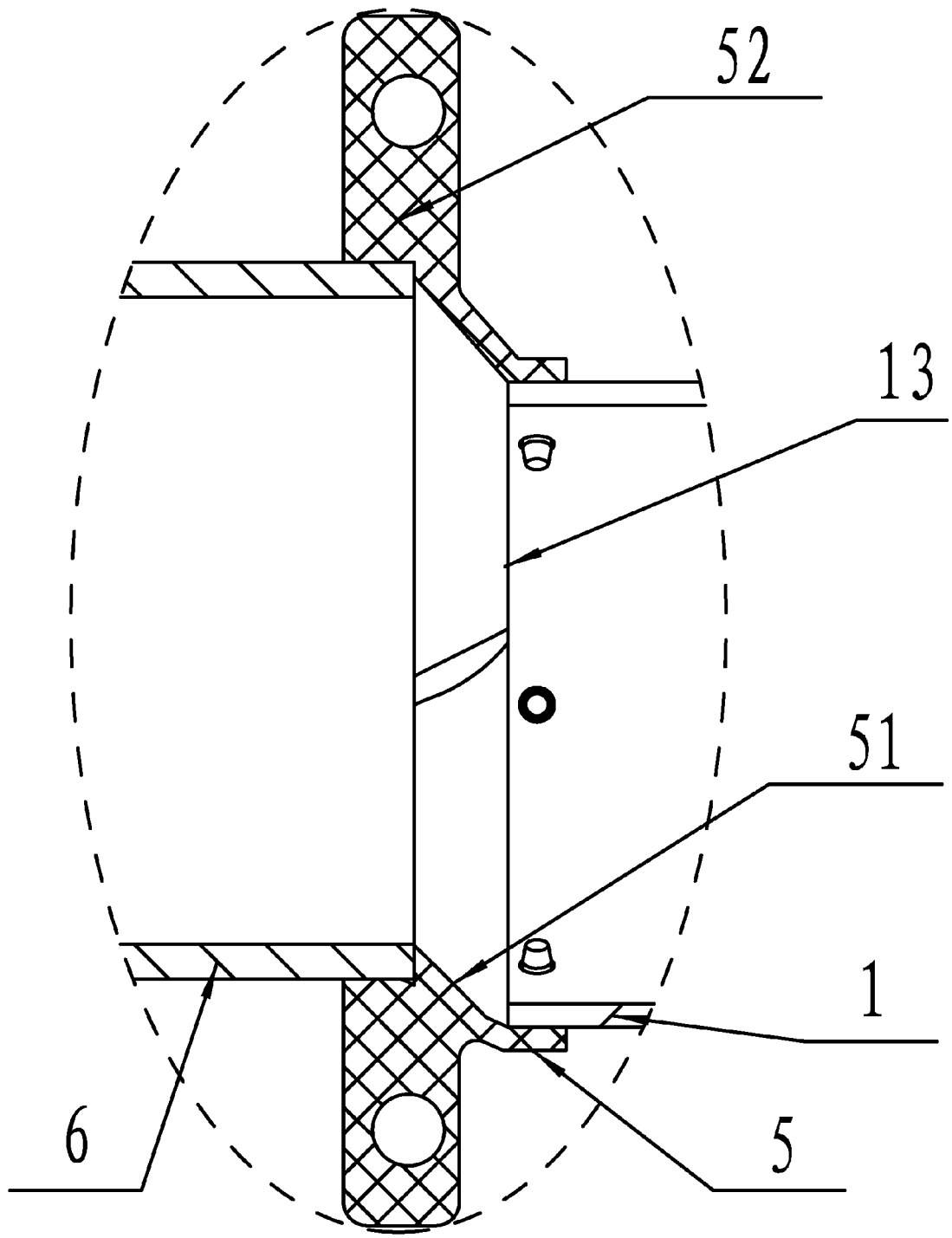
FIG. 8 is an enlarged view taken from part C-C of FIG. 7.
Figure 9:
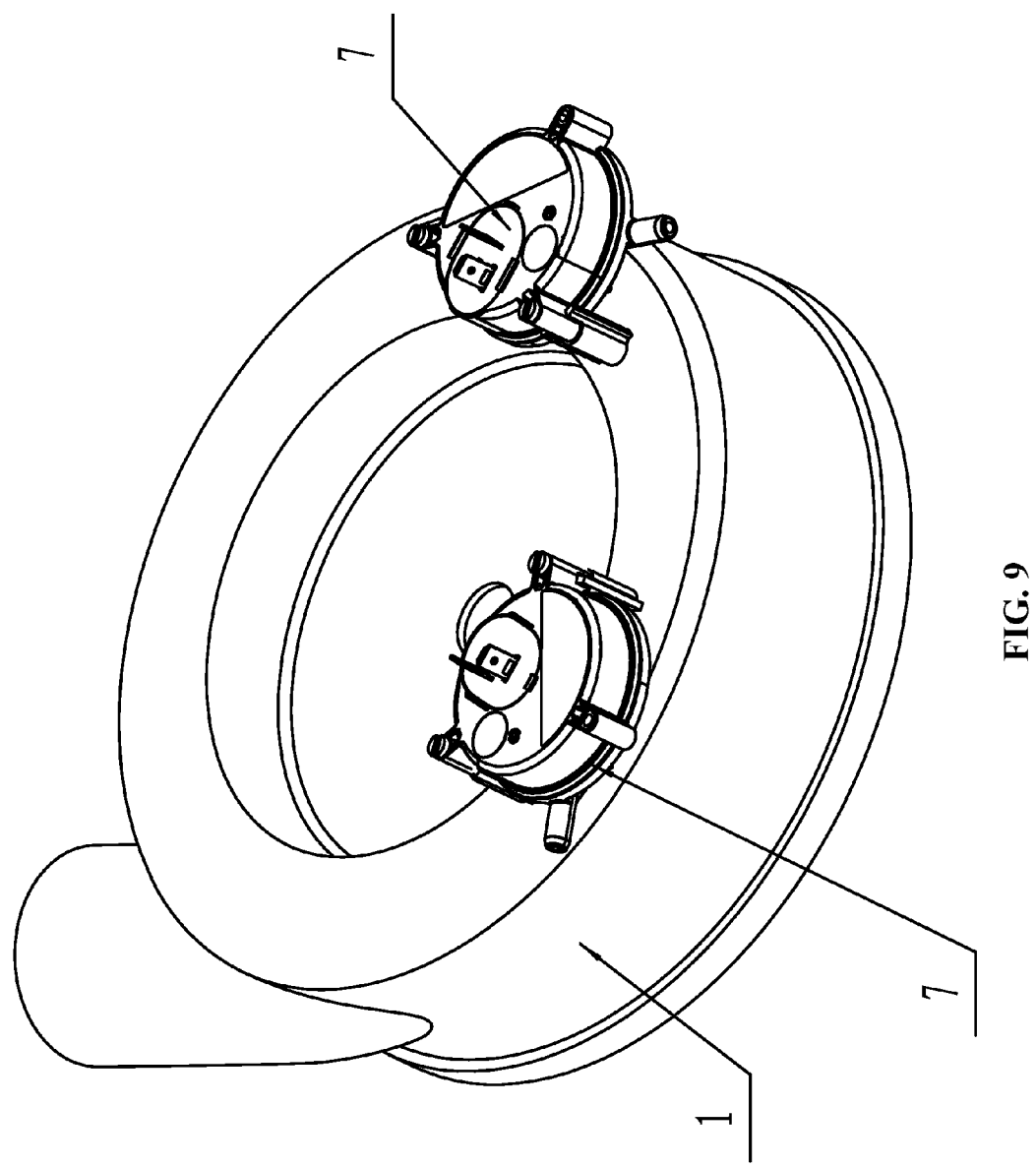
FIG. 9 is an assembling stereogram of a volute and an air switch.
Figure 10:
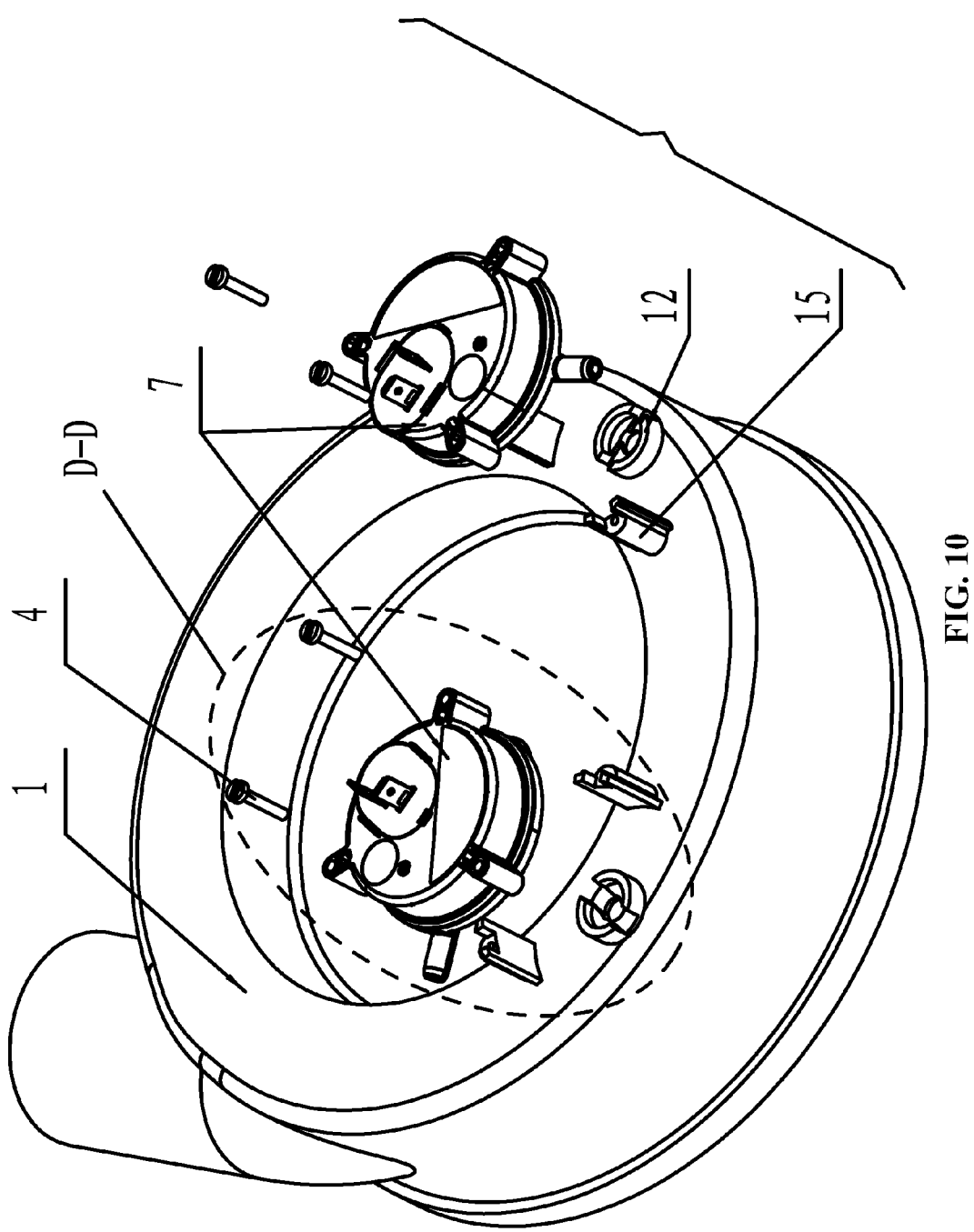
FIG. 10 is an exploded view of a volute and an air switch.
Figure 11:
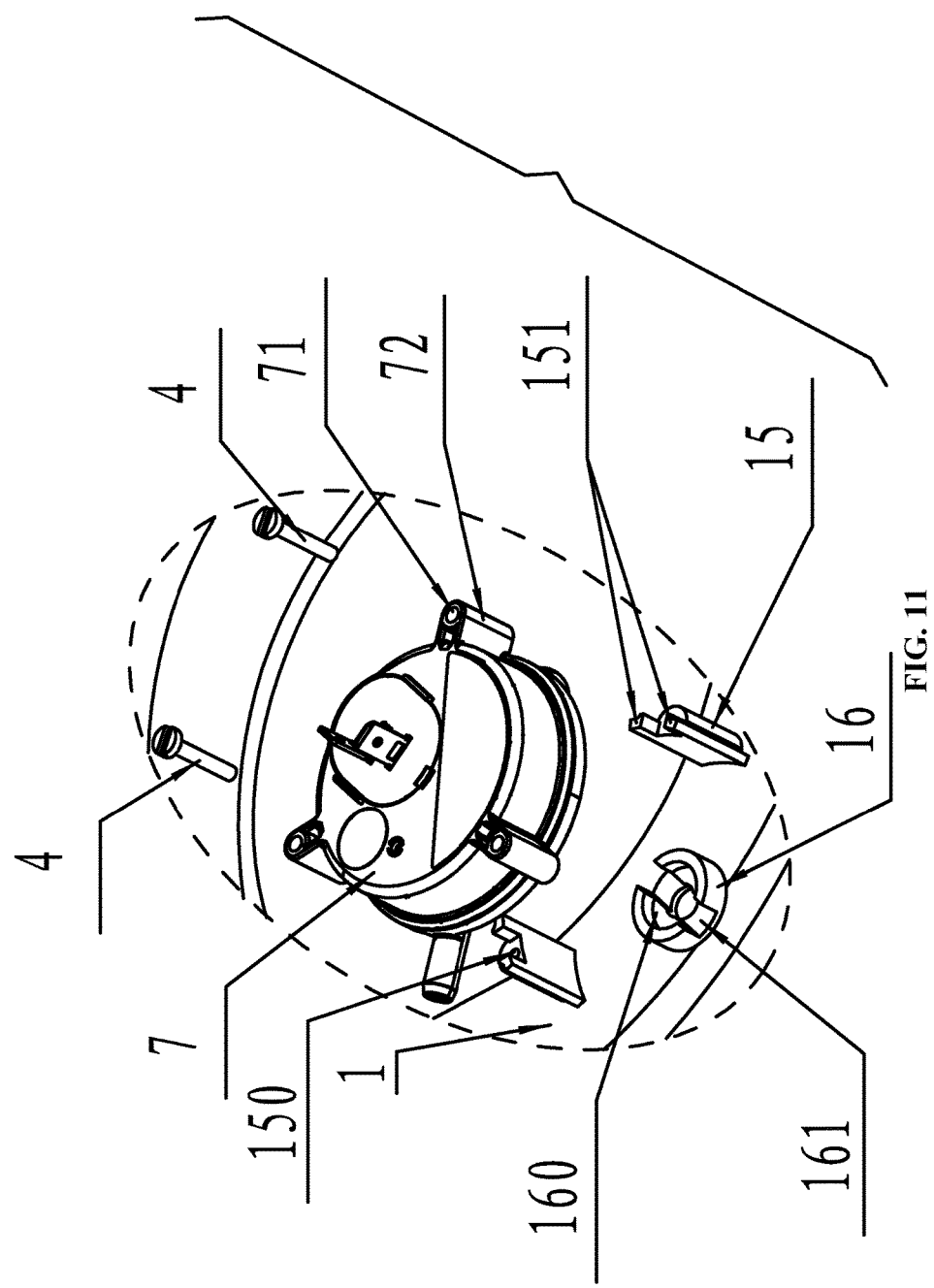
FIG. 11 is an enlarged view taken from part D-D of FIG. 10.
Figure 12:
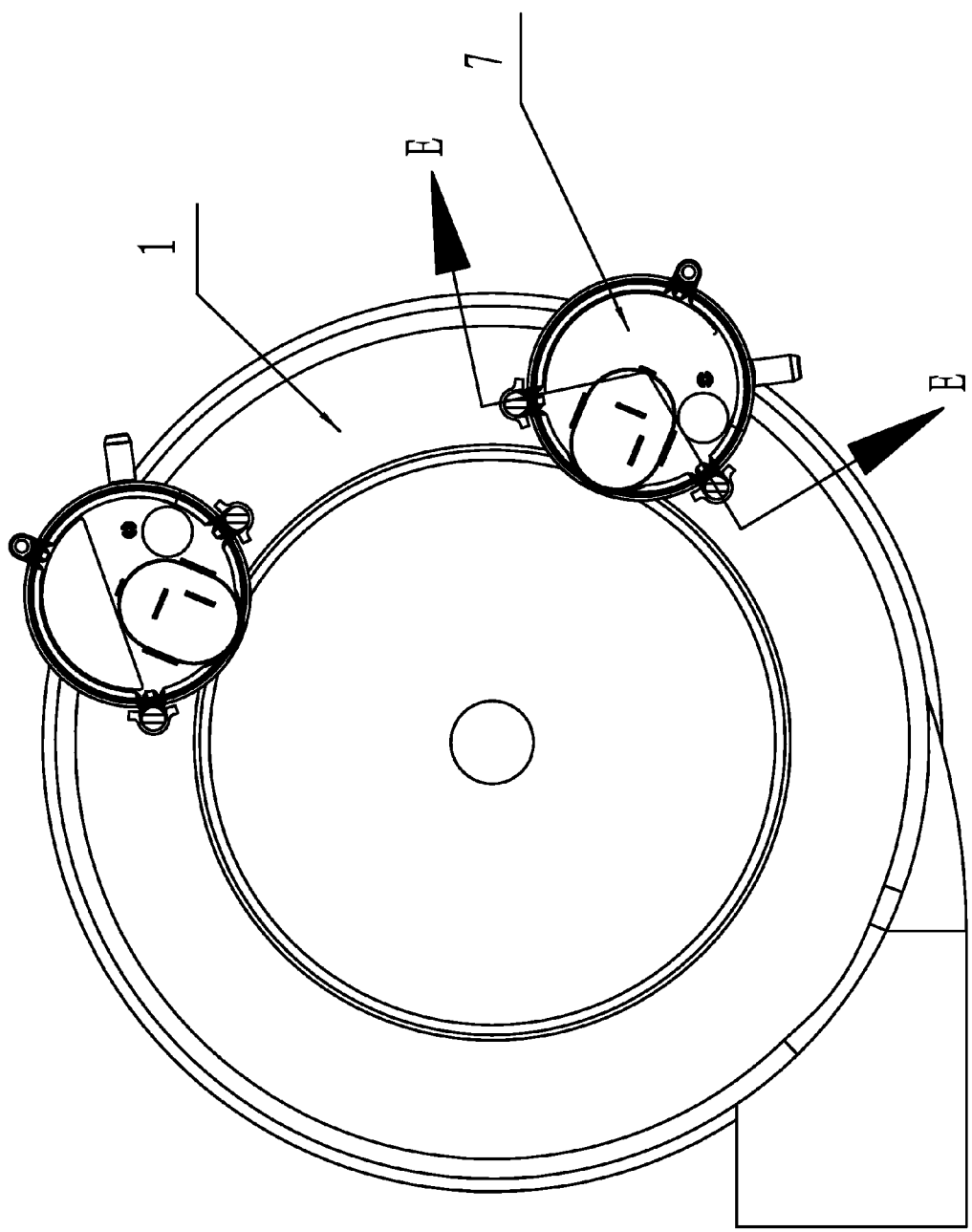
FIG. 12 is a schematic diagram of a volute and an air switch.
Figure 13:
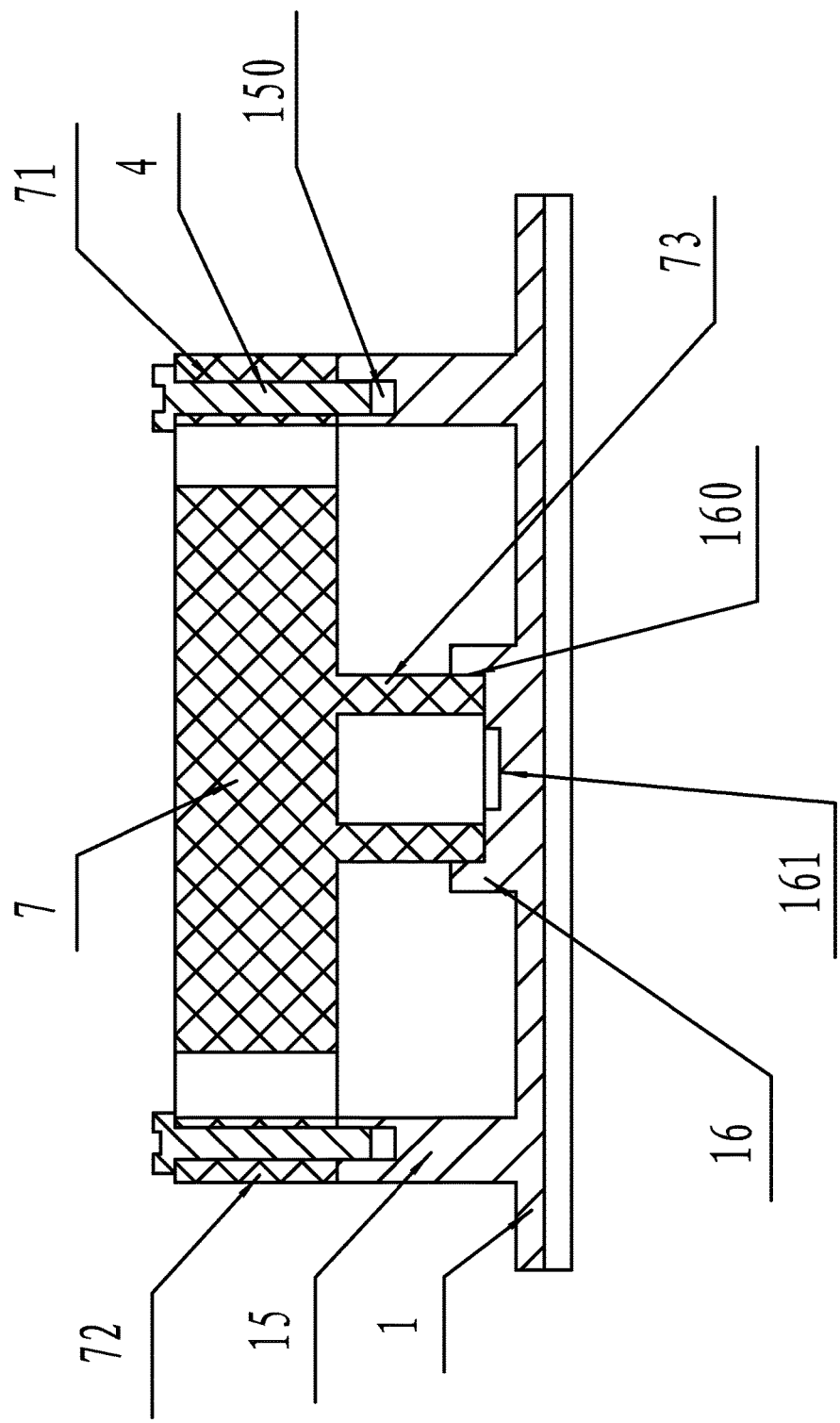
FIG. 13 is a cross sectional view taken from part E-E of FIG. 12.

As shown in FIGS. 7-8, based on Example 4, a diversion port 5 is disposed on the air outlet 13 of the volute 1. An air duct 6 is disposed on the diversion port 5. An inner wall of the diversion port 5 protrudes inclinedly to form a convex block 51. One end of the convex block 51 is close to the air outlet 13; and the other end of the convex block 51 is tightly attached to a side wall of the air duct 6.

Example 7

As shown in FIGS. 7-8, based on Example 6, the diversion port 5 is mounted on the volute 1 by a bolt.

Example 8

As shown in FIGS. 7-8, based on Example 6 or 7, the diversion port 5 comprises a lug 52.

Example 9

As shown in FIGS. 7-8, based on Example 1, a plurality of mounting columns are disposed on the volute 1. Each mounting column 15 comprises a threaded hole 150. An air switch 7 comprising a mounting foot 72 comprising a mounting hole 71 is provided; and a bolt 4 is inserted into the mounting hole 71 and threaded into the threaded hole 150 for fixing the air switch 7 on the volute 1.

Example 10

As shown in FIGS. 9-13, based on Example 9, the mounting column 15 comprises two positioning columns 151 disposed on two sides of the threaded hole 150. An inner surface of each positioning column 151 matches with a lateral face of the mounting foot 72. The mounting foot 72 is fastened by the positioning columns 151.

Example 11

As shown in FIGS. 9-13, based on Example 9 or 10, the number of the mounting columns is two.

Example 12

As shown in FIGS. 9-13, based on Example 11, a block 16 is disposed on the volute 1 between the two mounting columns 15. The block comprises a recess 160. The air switch 7 comprises a duct 73 protruding downward from a base of the air switch 7. The duct 73 is supported by a base of the recess 160.

Example 13

As shown in FIGS. 9-13, based on Example 12, the block 16 comprises a gap 161; and the gap 161 is in communication with the recess 160.

The top of the volute 1 comprising a flat surface formed by one step or an annular boss 14 formed by two steps. The volute 1 comprises: the cavity 11, and the first through hole 12. The manometric interface 2 comprises a second through hole 21 inside. The cavity 11 is arranged inside the volute 1 for accommodating a wheel. The manometric interface 2 is disposed in the first through hole 12 and is movable along an axial direction of the first through hole 12. The second through hole 21 and the cavity 11 are in communication. Center point O2 of the manometric interface 2 is disposed in an area A formed by rotating line L2 clockwise for angle α; and angle α is between 5° and 10°. The manometric interface is disposed in the largest negative pressure area, thereby improving the output value of the negative pressure and the safety factor. In the meanwhile, the diversion port 5 is disposed on the air outlet 13. The air duct 6 is disposed on the diversion port 5. The inner wall of the diversion port 5 protrudes inclinedly to form the convex block 51. One end of the convex block 51 is close to the air outlet 13; and the other end of the convex block 51 is tightly attached to the side wall of the air duct 6. As indicated by the arrow in FIG. 7, the air flows along the convex block of the diversion port 5 into the air duct 6. Thus, the structure of the diversion port 5 prevents the back streaming phenomenon caused by the dislocation of the air duct and the air outlet, and the air stream passes more fluently through the air outlet of the volute. A plurality of mounting columns comprising the threaded hole are disposed on the volute 1. The air switch 7 comprising the mounting foot 72 comprising the mounting hole 71 is provided; and a bolt 4 is inserted into the mounting hole 71 and threaded into the threaded hole 150 for fixing the air switch 7 on the volute 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A volute mechanism for a blower, the volute mechanism comprising:
   a) a volute, the volute comprising a cavity and a housing; the housing comprising a first side wall having a first through hole, and a second side wall disposed opposite the first side wall;
   b) a manometric interface having a first length, the manometric interface comprising a second through hole and a detection end, the detection end having a flange; and
   c) a sealing sleeve having a second length, the sealing sleeve comprising an end and a mounting hole;
   wherein:
   the cavity is enclosed by the housing;
   the end of the sealing sleeve is disposed on the first side wall and projects into the first through hole;
   the manometric interface is disposed in the mounting hole;
   the detection end is insertable into the cavity for detecting pressure;
   the first length is greater than the second length;
   the sealing sleeve is fixed with respect to the housing;
   the manometric interface is movable with respect to the sealing sleeve and the housing along the axial direction of the mounting hole, wherein the manometric interface is movable to change a distance between the detection end and the second side wall so as to detect pressures at different depths of the cavity in the housing;
   the flange is adapted to be in contact with and be blocked by the end of the sealing sleeve when the manometric interface moves;
   the second through hole is disposed inside the manometric interface; and
   the second through hole and the cavity are in communication.

2. The volute mechanism of claim 1, the sealing sleeve further comprising a neck;
   wherein:
   the neck is arranged on an outer side of the sealing sleeve; and
   the neck is received by a base plate of the volute.

3. The volute mechanism of claim 1, wherein
the volute comprises a side and a top, the side comprises an air outlet, and the top is convex to form an annular boss;
the manometric interface is disposed on the annular boss behind the air outlet and in communication with the cavity;
a line L1 is perpendicular to a cross section of the air outlet, a line L2 crosses a center point O1 of the volute and is perpendicular to the line L1;
the manometric interface comprises a center point O2;
the center point O2 is disposed in an area formed by rotating the line L2 clockwise for an angle α; and
the angle α is between 5° and 10°.

4. The volute mechanism of claim 3, wherein the center point O2 is arranged in a middle part of the area.

5. The volute mechanism of claim 3, wherein
a diversion port is disposed on the air outlet of the volute;
an air duct is disposed on the diversion port;
an inner wall of the diversion port is convex and inclined to form a convex block;
one end of the convex block is close to the air outlet; and
the other end of the convex block is tightly attached to a side wall of the air duct.

6. The volute mechanism of claim 5, wherein the diversion port is mounted on the volute by a bolt.

7. The volute mechanism of claim 5, wherein the diversion port comprises a lug.

8. The volute mechanism of claim 6, wherein the diversion port comprises a lug.

9. The volute mechanism of claim 1, wherein
a plurality of mounting columns are disposed on the volute;
each mounting column comprises a threaded hole;
an air switch comprising a mounting foot comprising a mounting hole is provided; and
a bolt is inserted into the mounting hole and threaded into the threaded hole for fixing the air switch on the volute.

10. The volute mechanism of claim 9, wherein
the mounting column comprises two positioning columns disposed on two sides of the threaded hole;
an inner end wall of each positioning column matches with a lateral face of the mounting foot; and
the mounting foot is fastened by the positioning columns.

11. The volute mechanism of claim 9, wherein the number of the mounting columns is two.

12. The volute mechanism of claim 10, wherein the number of the mounting columns is two.

13. The volute mechanism of claim 11, wherein
a block is disposed on the volute between the two mounting columns;
the block comprises a recess;
the air switch comprises a duct protruding downward from a base of the air switch; and
the duct is supported by a base of the recess.

14. The volute mechanism of claim 12, wherein
a block is disposed on the volute between the two mounting columns;
the block comprises a recess;
the air switch comprises a duct protruding downward from a base of the air switch; and
the duct is supported by a base of the recess.

15. The volute mechanism of claim 13, wherein the block comprises a gap; and the gap is in communication with the recess.

16. The volute mechanism of claim 14, wherein the block comprises a gap; and the gap is in communication with the recess.

* * * * *